Patented Mar. 27, 1934

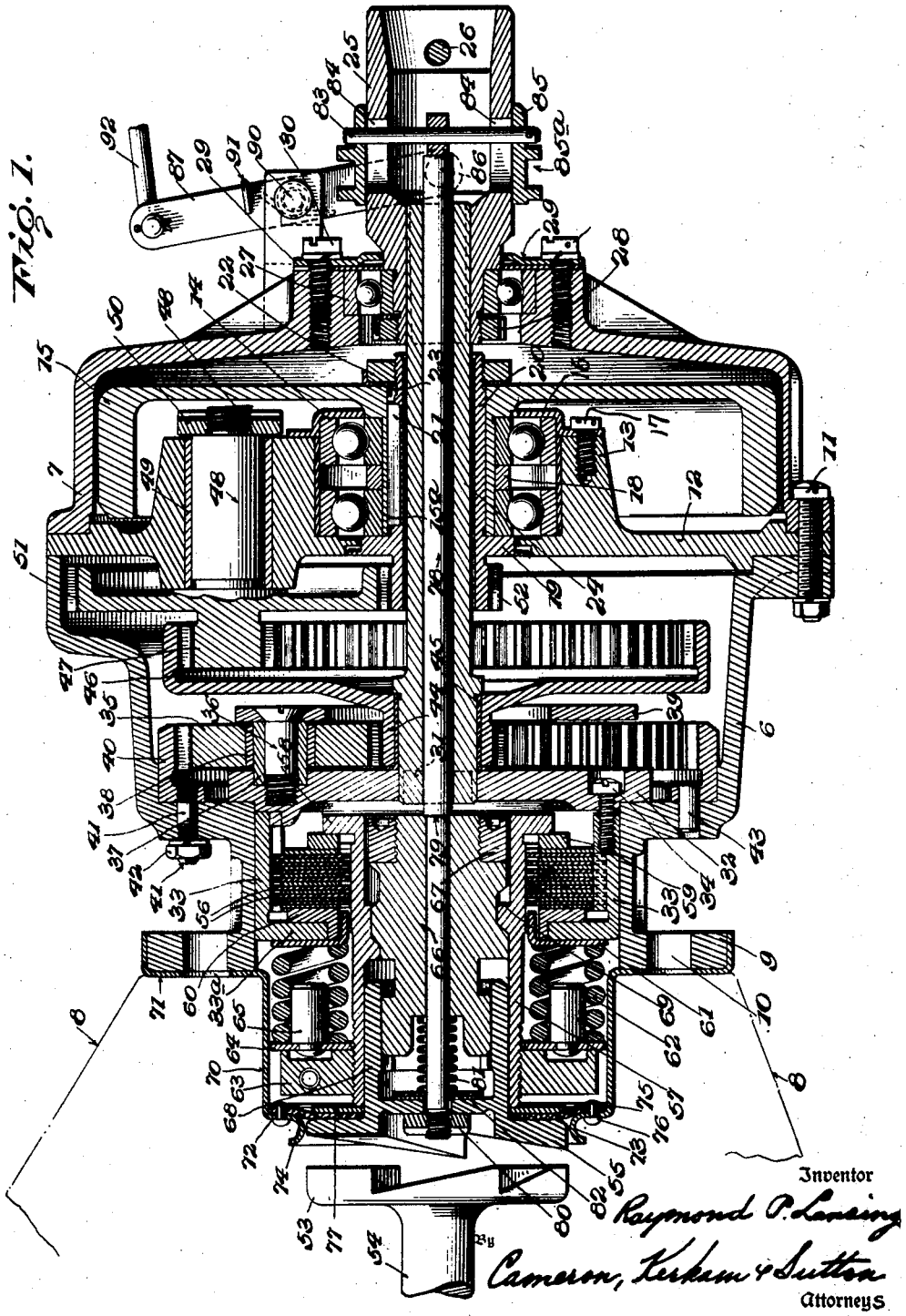

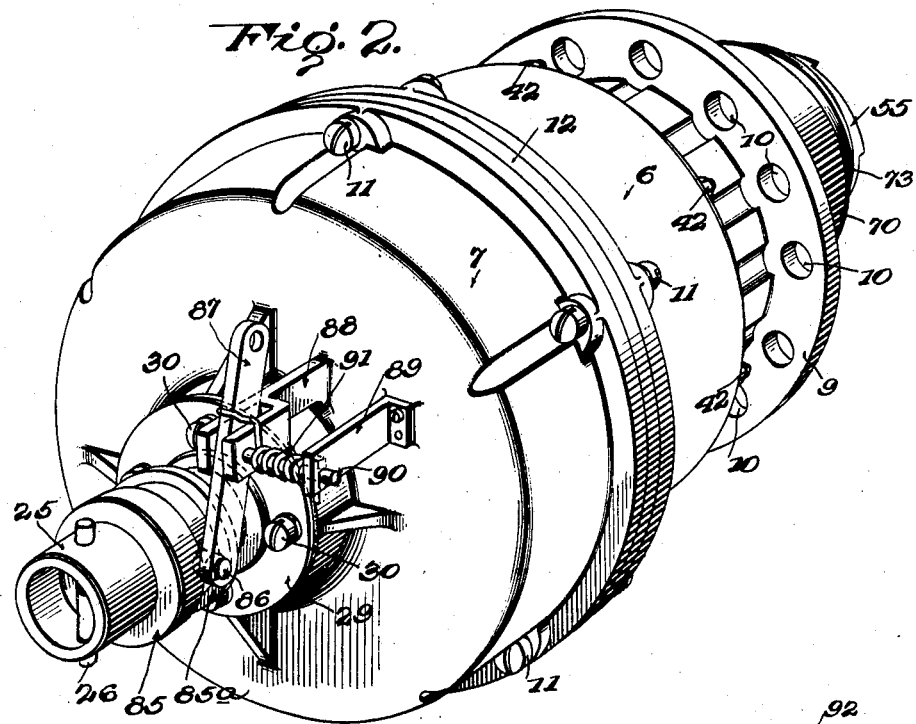
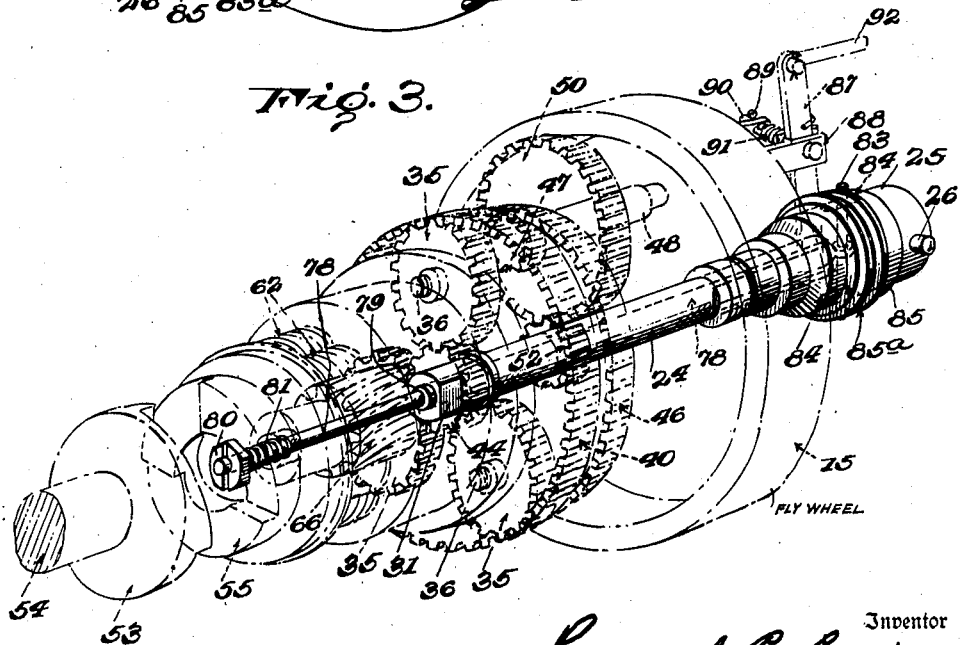

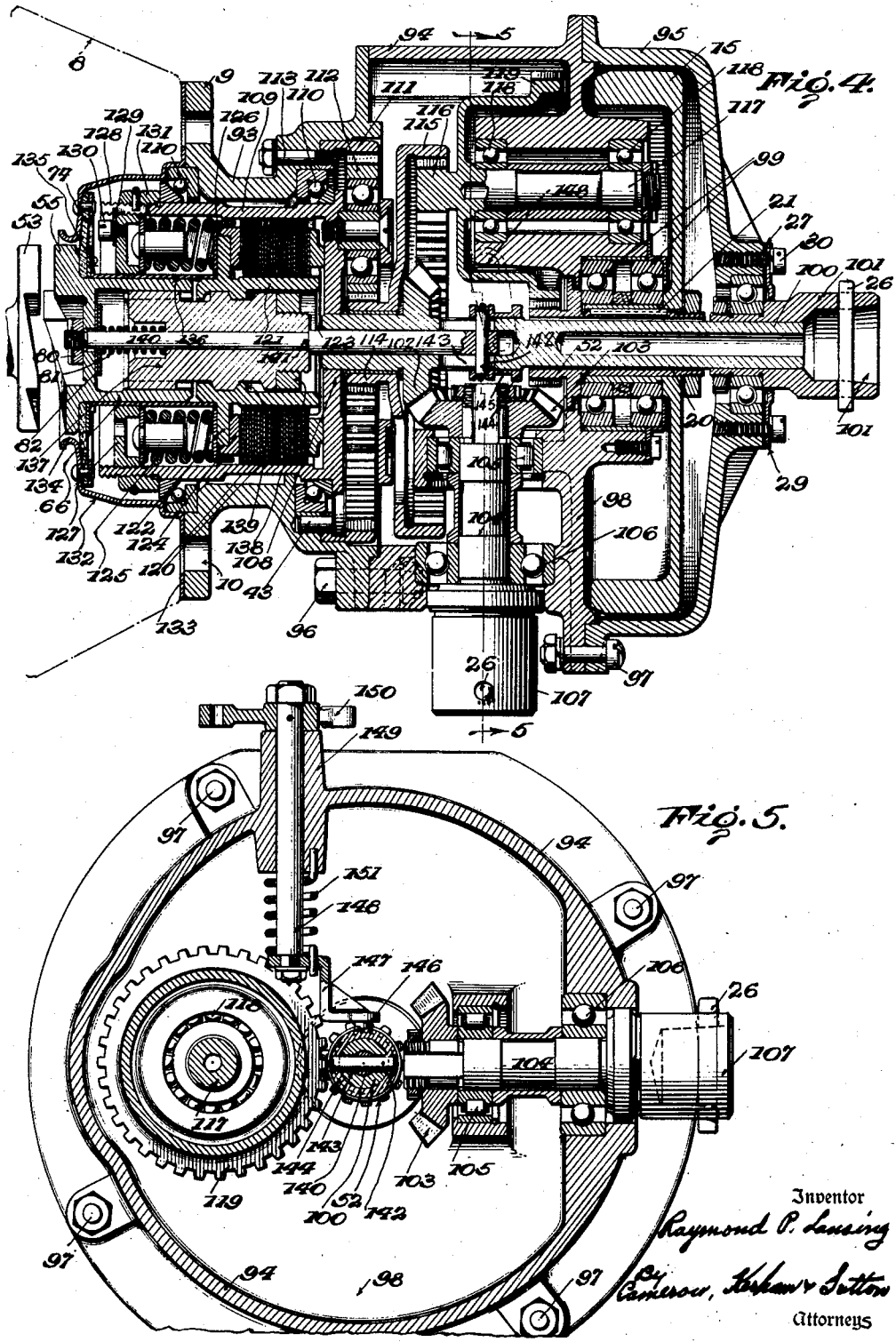

1,952,262

UNITED STATES PATENT OFFICE 1,952,262

ENGINE STARTING MECHANISM

Raymond P. Lansing, Montclair, N. J., assignor to Eclipse Machine Company, Elmira Heights, N. Y., a corporation of New York Application December 1, 1928, Serial No. 323,142

7 Claims. (Cl. 123—179)

This invention relates to starters for internal combustion engines, and more particularly to engine starters of the inertia type.

One of the objects of the present invention is to provide a starter which is particularly adapted for cheapness of manufacture, all parts being round and concentric without cross bores or parts complicated for manufacture.

Another object of the invention is to provide an engine starter of the type employing a clutch member adapted to engage, but normally disengaged from a member of the engine to be started, and embodying novel means for moving the clutch member into driving engagement with the engine member to be driven.

A further object is to provide an inertia starter embodying novel means for rotating the fly wheel or inertia element.

Two embodiments of the present invention are shown in the accompanying drawings, but it is to be expressly understood that the drawings are for purposes of illustration only and are not designed as a definition of the limits of the invention, reference being had to the appended claims for this purpose.

Referring to the drawings, wherein like reference characters refer to like parts throughout the several views, Fig. 1 is an axial sectional view illustrating one embodiment of the present invention;

Fig. 2 is a perspective view of the structure shown in Fig. 1;

Fig. 3 is a diagrammatic perspective more particularly illustrating one form of meshing apparatus which may be employed;

Fig. 4 is a longitudinal sectional view of another embodiment of the present invention; and Fig. 5 is a section taken on the line 5—5 of Fig. 4.

Referring more particularly to the embodiment of the invention illustrated in Figs. 1 to 3 inclusive, the starter there shown comprises a housing constituted by an inner section 6 and an outer section 7. The inner section of the housing is adapted to be secured to an internal combustion engine 8 or other device to be actuated, and for this purpose said section may be provided with a flange 9 having suitable openings 10 to receive bolts or other securing means whereby the starter may be mounted in operative position. The outer section 7 may be secured as by means of threaded bolts 11 to inner section 6, the bolts passing through openings in suitable flanges provided on the adjacent ends of said sections.

A diaphragm 12 is clamped between the flanges of sections 6 and 7 by the bolts 11 and is provided centrally thereof with a laterally projecting boss 13 in which are mounted two ball bearings 14 for rotatably supporting a fly wheel or inertia member 15 that is of small size. A retainer 16 that is attached to the face of boss 13 by screws 17 is preferably provided for the ball bearings 14. Interposed between the inner races of bearings 14 and surrounding the hub 15a of the fly wheel is a spacing ring 18 which maintains said races in engagement with a shoulder formed on the fly wheel and a flange 19 formed on the outer surface of a hollow shaft 20 that extends through the hub 15a. The shaft 20 is drivably connected to the hub of the fly wheel as by means of a key 21 and is held against longitudinal movement relative to said fly wheel by means of the shoulder 19 and a nut 22 positioned on the outer threaded end of the shaft. A lock washer 23 may be provided for nut 22.

Means are provided for rotating the fly wheel at high speed whereby energy is stored therein for starting the engine. As shown, there is provided for this purpose, a hollow cranking shaft 24 that extends freely through the hollow shaft 20 and projects outwardly through an opening formed in the center of housing section 7. The cranking shaft has two diametrically disposed, segmental portions cut from its outer end (Fig. 3), the cuts extending inwardly to the plane of the inner surface of the end wall of housing section 7. Fitted onto the cut-away portion of shaft 24 is a sleeve 25 provided with laterally projecting pins 26 to receive a crank handle not shown.

Means are provided for rotatably supporting shaft 24 in housing section 7. For this purpose the housing section carries a ball bearing 27 which engages and supports the inner end of sleeve 25 which preferably has a driving fit with shaft 24. The inner, reduced end of sleeve 25 is threaded to receive a nut 28, provided with a suitable lock washer, that engages the inner race of bearing 27. Retaining means which include discs 29 and screws 30 are secured to the outer face of housing section 7 for bearing 27.

The inner end of cranking shaft 24 has segmental portions cut therefrom as shown more clearly at 31 in Fig. 3, and carries a disc 32 which preferably has a driving fit with the cut-away portion of said shaft. A cylindrical member 33 that is rotatably mounted in inner housing section 6 is drivably connected to the inner shaft of disc 32 by means of screws 34. The cylindrical member 33, which is provided on its inner end with an inwardly extending flange 33a, and the disc 32 constitute a barrel which supports a plurality of planetary gears 35 one of which is shown in cross section in Fig. 1. Each of the gears 35 is rotatably mounted on a screw 36 that is threaded into the outer face of disc 32 and is disposed substantially parallel to shaft 24, the screws being spaced at equal angular intervals around said disc. Surrounding each screw 36 is a sleeve 37 that extends into a recess in the outer face of disc 32. A bushing 38 is interposed between the hub of gear 35 and sleeve 37 for rotatably supporting said gear and suitable spacing rings are provided to prevent endwise movement of said bushing relative to said gear. In the form shown, three planetary gears are employed and the three screws 36 therefor carry on their outer ends a retaining ring 39 for maintaining the gears, sleeves and bushings in operative relation.

A stationary internal spur gear 40, which surrounds and has meshing engagement with each of the planetary gears 35, is secured to housing section 6 by means of studs 41 provided on their outer ends with nuts 42 and suitable lock washers. In order to facilitate assembly of spur gear 40 with inner housing section 6 there is provided a dowel 43 having a driving fit in a suitable opening in said housing section and adapted to extend into an opening in gear 40.

Planetary gears 35 mesh with a sun gear 44 that is rotatably mounted as by means of a bushing 45 on the inner, enlarged portion of hollow shaft 24. Preferably, sun gear 44 is formed integrally with a large internal spur gear 46 which is concentric with shaft 24 and which meshes with a pinion 47 drivably connected to the inner end of a lay shaft 48 that is rotatably mounted as by means of a bushing 49 in an enlarged bearing portion of the diaphragm 12. Shaft 48 and bushing 49 are held against longitudinal movement relative to diaphragm 12 by means of a suitable shoulder formed on said shaft and a nut 50 threaded onto the outer reduced end of the shaft. A spur gear 51 is also provided on shaft 48, for rotation therewith, closely adjacent pinion 47 and this gear meshes with a pinion 52 formed on the inner end of hollow shaft 20.

When the crank handle (not shown) is engaged with sleeve 25, rotation of the crank is transmitted by shaft 24 to the barrel 32, 33, planetary gears 35, sun gear 44, spur gear 46, pinion 47, spur gear 51 and pinion 52 to fly wheel 15. Due to the step-up train of gearing employed, one revolution of the crank handle is effective to rotate the fly wheel a very large number of times, and the parts are preferably so arranged and constructed that the fly wheel may be manually brought to a speed of rotation in excess of ten thousand R. P. M., whereby sufficient energy is stored therein to start the engine.

Means are provided for imparting the energy stored in the fly wheel to the engine crank shaft. For this purpose there is provided a clutch jaw 53 provided on the engine crank shaft 54, or an extension thereof, which jaw is adapted to be engaged by a similar jaw 55 driven by the fly wheel. Normally, jaw 55 is maintained out of driving engagement with jaw 53 by means to be described more fully hereafter.

If the energy of the rapidly rotating fly wheel were applied to the engine crank shaft through rigid connections, damage to the starter parts would result. Accordingly, yielding means are provided intermediate the gear train described above and the jaw member 55, whereby slippage may occur between said jaw member and the gear train when the two jaws are drivingly engaged and until the engine crank shaft 54 has been brought up to the speed of jaw 55.

In the form shown, the yielding means is constituted by a multiple disk friction clutch comprising a plurality of annular disks 56 positioned within the cylindrical member 33, a number of said disks being splined on their outer peripheries to the inner surface of member 33, and in interleaving relation with the remaining disks, which are splined to an interiorly threaded nut or sleeve 57. The outer end of sleeve 57, which extends to a point closely adjacent the inner face of disk 32, is provided with a flange 58. Interposed between flange 58 and the adjacent clutch disk is a spacing ring 59. A spacing ring 60 is also provided between the inwardly extending flange of member 33 and the adjacent clutch disk. Bearing against the inner face of the flange of member 33 is a washer 61 against which bear the outer ends of a plurality of coil springs 62. The inner end of sleeve 57 is threaded to receive a nut 63 which bears against the inner ends of springs 62 and provides means for adjusting the compression of said springs. If desired these springs may be maintained in proper spaced relation around sleeve 57 by means of a ring 64 which engages the nut 63 and is provided with a plurality of studs 65 which extend within the springs.

By adjusting the position of nut 63 relative to sleeve 57 the compression of springs 62 is varied and the force with which flange 58 maintains disks 56 in friction engagement is likewise varied. The force of springs 62 acts through nut 63 in a manner tending to move sleeve 57 to the left relative to member 33. Accordingly flange 58 acts through spacing ring 59 to move disks 56 more closely into engagement, the disks being held against movement to the left by means of spacing ring 60 and the flange of member 33.

Positioned within sleeve 57 and adapted for longitudinal and rotary motion relative to said sleeve is a threaded shaft 66 which carries on its outer end a stop nut 67 and which is longitudinally splined at its inner end to drivably engage the splined hub 68 of the jaw member 55. Shaft 66 can move to the left relative to sleeve 57 until stop nut 67 engages a shoulder 69 formed interiorly of said sleeve. Thereafter the sleeve, threaded shaft 66 and jaw member 55 rotate in unison and transmit the torque from the clutch to jaw member 53 on the engine crank shaft. Due to the splined connection between jaw member 55 and shaft 66 these parts are adapted for relative longitudinal movement as will be pointed out more fully hereafter.

If the oil from the engine crank case seeps into the starter housing it seriously interferes with the operation of the starter and this is particularly true in cold weather. Accordingly, the starter of the present invention is provided on the engine end thereof with oil sealing means comprising a cup-shaped member 70 having a flange 71 which is bent around the periphery of flange 9 of housing section 6 and which is clamped between said flange 9 and the engine crank case by means of the bolts (not shown) which extend through openings in flanges 9 and 71. Member 70 is bent inwardly as at 72 to provide an annular shoulder and the inner end of member 70 is curved as at 73 to form a circular flange having an inner diameter that is slightly greater than the outer diameter of jaw member 55 whereby the latter is freely movable relative to the cup-shaped member 70. Attached to the inner face of the shoulder 72 is an annular flexible washer 74 that is preferably formed of leather, the washer being secured in position as by means of a ring 75 and a plurality of rivets 76 which extend through said ring, washer and shoulder 72. Interposed between the washer 74 and the adjacent inner end of sleeve 57 is a metal ring 77, and shoulder 72 is so located that ring 77 normally holds washer 74 flexed outwardly in close engagement with the adjacent face of the enlarged head of jaw member 55.

Means are provided for moving jaw 55 into driving engagement with jaw 53 when it is desired to start the engine and after a desired amount of energy has been stored in fly wheel 15. For this purpose there is provided a concentrically disposed rod 78 which slidably extends through hollow shaft 24 and threaded shaft 66. Intermediate its ends rod 78 is provided with a shoulder 79 which normally abuts against the outer end of threaded shaft 66. The inner end of rod 78 passes loosely through an opening in the hub of jaw member 55 and threaded on said inner end is a nut 80 which abuts against the inner face of the hub of jaw member 55. Interposed between threaded shaft 66 and the hub of jaw member 55 is a coil spring 81 which surrounds rod 78 and bears at its inner end against a pair of washers 82 the inner one of which is preferably formed of some flexible material such as leather. Spring 81 yieldingly resists movement of shaft 66 toward jaw member 55 and washers 82 coact with washer 74 to prevent seepage of oil from the engine crank case into the starter housing.

The outer end of rod 78 extends into sleeve 25 and carries a transversely extending pin 83 which projects through diametrically disposed slots 84 formed in said sleeve. The outer ends of pin 83 project through openings in a collar 85, which slidably surrounds sleeve 25 and is provided with an annular groove 85a. Rod 78, pin 83 and collar 85 are adapted to move as a unit relative to sleeve 25 and shaft 24. A trunnion or pin 86 which extends loosely into groove 84 is carried on the lower end of a lever 87 that is pivotally mounted on the bifurcated end of a fulcrum member 88 secured to or formed integrally with the housing section 7. Extending substantially parallel to rod 78 is an arm 89 which rotatably supports one end of the pivot member 90 for lever 87. Surrounding pivot member 90 and anchored to one end of arm 89 is a coil spring 91 which is secured to lever 87 above the pivotal axis of the latter whereby said spring tends to maintain collar 85 in a position such that pin 83 is in the outer ends of slots 84. A pull rod or cord 92 is pivotally connected in any suitable manner to the upper end of lever 87.

The operation of the apparatus is as follows: A crank handle (not shown) is attached by means of pins 26 to sleeve 25 and is actuated to rotate cranking shaft 24. Pin 83 and collar 85 together with rod 78 rotate in unison with the cranking shaft and motion of the latter is transmitted through barrel 32, 33, planetary gears 35, sun gear 44, spur gear 46, pinion 47, spur gear 51 and pinion 52 to the fly wheel. Sleeve 57, shaft 66 and jaw 55 rotate in unison with the barrel. When the fly wheel has been brought to the desired speed of rotation, i. e., when sufficient energy for starting the engine has been stored in said fly wheel, the operator exerts a pull on rod 92 whereby collar 85, pin 83 and rod 78 are forced to the left as viewed in Fig. 1, pin 83 moving freely in slots 84. Shoulder 79 forces threaded shaft 66 to the left until stop nut 67 engages shoulder 69, the movement of shaft 66 being transmitted through spring 81 to jaw 55 to move the latter into full mesh with jaw 53. The energy of the fly wheel 15 is now effective to start the engine and while crank shaft 54 is being brought up to the speed of jaw 55 the clutch permits slippage between sleeve 57 and barrel 32, 33, whereby damage to the starter parts is prevented.

After the engine starts under its own power the speed of rotation of jaw 53 becomes greater than the speed of jaw 55. The inclined faces of the teeth of the jaws are now effective to force jaw 55 away from the crank shaft and against the tension of spring 81 in the event that rod 78 is being held in meshing position. When the operator releases lever 87 the tendency of jaw 53 to drive jaw 55 coacts with the threads of sleeve 57 and shaft 66 to completely demesh jaw 55 and return the parts to normal position. This action is facilitated by the return of rod 78 to normal position under the action of spring 91.

Referring more particularly to the embodiment of the invention shown in Figs. 4 and 5 the starter comprises a housing formed of three sections, an inner section 93, an intermediate section 94, and an outer section 95. The intermediate section is secured to section 93 by means of bolts 96 while the outer section is secured to the intermediate section by means of bolts 97. Formed integrally with the intermediate section is a diaphragm 98 which carries centrally thereof a pair of ball bearings 99 for rotatably supporting a hollow shaft 20 which is drivably connected as by means of a key 21 to a fly wheel 15.

Extending loosely through shaft 20 is a concentrically disposed cranking shaft 100 which carries on its outer end a sleeve 101 which surrounds and is drivably attached to said cranking shaft. The latter is rotatably mounted at its outer end in housing section 95 as by means of a ball bearing 27 which engages the inner reduced end of sleeve 101. Cranking shaft 100 is provided adjacent its inner end with a bevel gear 102 which, in the form shown, is made integral with said shaft and which meshes with a bevel gear 103 drivably connected to the inner end of a cranking shaft 104 that extends substantially at right angles to the longitudinal axis of the starter and to the longitudinal axis of cranking shaft 100. A roller bearing 105 and a ball bearing 106 are provided for rotatably mounting the cranking shaft 104. Roller bearing 105 is mounted in an inwardly projecting portion of web 98 while bearing 106 is mounted in the wall of intermediate housing section 94. The end of shaft 104 that projects exteriorly of the housing is provided with a sleeve 107 adapted to receive a hand crank not shown.

The inner end of cranking shaft 100 is drivably connected to the outer closed end 108 of a barrel 109 that is rotatably mounted as by means of ball bearing 110 in housing section 93. Projecting outwardly from the closed end of barrel 109 and rotatably mounted thereon are three planetary gears one of which is shown in section at 112. These planetary gears, which are spaced apart at angular intervals of 120°, mesh with a stationary internal spur gear 111 that is fixedly secured to housing section 93 as by means of studs 113. The planetary gears 112 also mesh with a sun gear 114 that is rotatably mounted intermediate bevel gear 102 and barrel end 108 on the cranking shaft 100. Drivably connected to sun gear 114 is an internal spur gear 115 which meshes with a pinion 116 carried on the inner end of a stub shaft 117 that is rotatably mounted as by means of ball bearings 118 in the diaphragm 98. A bell-shaped member having the large end thereof formed as a spur gear 119 is drivably connected to shaft 117 closely adjacent pinion 116. Gear 119 meshes with a pinion 52 formed integrally with the inner end of hollow shaft 20.

The energy of fly wheel 15 is adapted to be transferred to the starter jaw 53 carried on the engine crank shaft by means of the jaw member 55. In order that this energy may be transferred without damage to the starter structure or engine a yielding clutch is provided intermediate barrel 109 and clutch jaw 55. In the form shown the clutch is constituted by a plurality of annular disks 120, a number of which are splined on their outer peripheries to the inner surface of barrel 109. The remaining clutch disks, which are in interleaving relation with those splined to the barrel, are splined to the outer surface of an interiorly threaded nut 121. A spacing or thrust ring is interposed between the outer clutch disk and the inner face of the closed end 108 of the barrel, and a spacing ring 124 is provided between the innermost clutch disk and the flange 122 of the threaded nut.

The disks 120 are held in frictional engagement by means of a plurality of coil springs 125 which bear at their inner ends against a washer 126 which is in engagement with flange 122, the compression of the springs being adjustable as by means of a nut 127 which is threaded into the inner end of barrel 109. The latter is longitudinally slotted as at 128 to receive a locking member 129 which is secured to nut 127 by means of a set screw 130 whereby nut 127 may be locked in adjusted position. When nut 127 is moved to the right relative to barrel 109 (Fig. 4) the compression of springs 125 is increased and the same act through flange 122 and ring 124 to force the clutch disks more closely into engagement, movement of said disks to the right being prevented by the closed end 108 of the rotatably mounted barrel.

A nut 131 is preferably threaded onto the outer surface of the inner end of barrel 109 to provide a retainer for the inner race of the adjacent ball bearing 110. A cup-shaped member 132 which is fitted over the inner end of the starter constitutes a retainer for the outer race of said bearing 110. The member 132 which is provided on its outer end with a flange 133 adapted to be clamped between flange 9 and the engine housing and having an opening 134 in its inner end through which jaw member 55 is freely movable, also constitutes one element of an oil seal to prevent seepage of oil from the engine crank case into the starter housing. Member 132 carries a flexible washer 74 described above, which washer is held in engagement with the adjacent face of jaw member 55 by means of a ring 135 and a sleeve 136 which surrounds and has sliding engagement with the laterally extending hub 66 of jaw member 55 and with the inner end of the threaded nut 121. The outer end of sleeve 136 abuts against flange 122 of the threaded nut.

Threaded into the nut 121 is a shaft 137 which carries on its outer end a stop nut 138 adapted to engage a shoulder 139 formed interiorly of the sleeve. The inner end of shaft 137 is longitudinally splined for driving engagement with the inner splined surface of the hub 66 of jaw member 55. Shaft 137 is adapted for rotary and longitudinal movement relative to nut 121 but when said shaft has moved to the left a distance such that nut 138 engages shoulder 139 it rotates in unison with nut 121 and drives jaw 55.

Means are provided for moving jaw member 55 into driving engagement with jaw member 53 whereby a torque transmitting connection is formed between the fly wheel and the engine crank shaft. As shown, said means are constituted by a rod 140 which is concentrically disposed relative to the starter and which slidably extends through jaw member 55, shaft 137 and the inner portion of cranking shaft 100. Intermediate its ends rod 140 is provided with a shoulder 141 that normally has abutting engagement with the outer end of threaded shaft 137. The outer end of rod 140 which terminates substantially adjacent the plane of cranking shaft 104, is provided with a transversely extending pin 142 that projects through diametrically disposed, longitudinal slots 143 formed in cranking shaft 100. A collar 144 provided with an annular groove 145 slidably surrounds the cranking shaft 100 and is provided with openings into which extend the opposite ends of pin 142. A pin or trunnion 146 which extends loosely into groove 145 is carried on the end of a Z-shaped lever 147 that is rigidly connected to the inner end of a rockshaft 148 which is rotatably mounted in a boss 149 provided in the wall of intermediate housing section 94. The outer end of shaft 148 extends through boss 149 and has rigidly attached thereto a bell crank lever 150. A coil spring 151, which is anchored at one end to boss 149 and at its opposite end to lever 147, surrounds the inner portion of rockshaft 148 and normally tends to maintain the parts in the position illustrated in Figure 4 with jaw 55 out of driving engagement with jaw 53. A coil spring 81 surrounds the inner end of rod 140 and abuts at its opposite ends against shaft 137 and washers 82 which coact with the washer 74 to prevent seepage of oil from the crank case into the starter housing.

When a crank handle (not shown) is engaged with sleeve 101 cranking shaft 100 may be rotated to bring fly wheel 15 up to the desired speed, the rotation of said shaft being transmitted through barrel 109 and the train of gearing described above. If it is not convenient to energize the fly wheel by means of cranking shaft 100 due to the interference of certain parts of the aeroplane or other engine carrying structure with the hand crank, said fly wheel may be energized by engaging the crank handle with sleeve 107. In the latter event cranking shaft 104 acts through bevel gears 103 and 102 to rotate barrel 109 which motion is transmitted through the train of gears to fly wheel 15.

After sufficient energy has been stored in the fly wheel to start the engine the operator exerts a pull on the bell crank lever 150 whereby shaft 148 is rotated and lever 147 is moved to force collar 144, pin 142 and rod 140 to the left (Fig. 4). Shoulder 141 acts to move shaft 137 to the left and this movement is yieldingly transmitted through spring 81 to jaw 55 whereby the latter is moved into full meshing engagement with jaw 53. The energy stored in fly wheel 15 is now effective to start the engine. The friction clutch permits slippage between threaded nut 121 and barrel 109 until the engine crank shaft has been brought up to speed.

After the engine starts under its own power and the speed of rotation of jaw 53 becomes greater than the speed of jaw 55, the inclined faces of the teeth of said jaws are effective to force jaw 55 away from jaw 53. In the event that the operator is still exerting a pull on bell crank lever 150 this movement of jaw 55 takes place against the tension of spring 81. When the operator releases lever 150 spring 151 is effective to return rod 140 to normal position.

The present invention thus embodies starting mechanism of the inertia type which is so constituted that the inertia member may be energized from the cock pit of an aeroplane, or if desired the cranking may be done from the side of the machine. Since the starter may be adjusted as a whole relative to the engine crank case the laterally extending cranking shaft 104 may be adjusted to project at any desired angle. Improved means are provided for moving jaw member 55 into driving engagement with the engine crank shaft. In the embodiment of the invention illustrated in Figure 1, all of the parts are concentrically disposed thereby insuring compactness and cheapness of manufacture. The starter housing is preferably formed of light metal such as aluminum, whereby the weight of the apparatus is materially reduced.

Various changes may be made in the details of construction and the arrangement of parts as will now readily occur to those skilled in the art. Reference is therefore to be had to the appended claims for a definition of the limits of the invention.

What is claimed is:

1. In an engine starter of the type having a fly wheel, an engine engaging clutch member, a housing for the starter, means including a concentrically disposed cranking shaft extending through said housing for rotating the fly wheel, means including a transversely disposed shaft extending through said housing and drivably engaging said cranking shaft at all times for rotating the latter, and means for moving said clutch member into driving engagement with the member of the engine to be started, said last named means including a pin rotatable by, and disposed in axial alignment with said transversely disposed shaft, and a rod extending through said cranking shaft and operatively connected with said pin.

2. In an engine starter of the type having a flywheel, an engine engaging clutch member, a housing for said starter, means for rotating said fly wheel including a longitudinally disposed cranking shaft rotatably supported in and extending through said housing, a shaft extending through said housing substantially at right angles to said cranking shaft, gearing for drivably connecting said shaft with said cranking shaft, and means for moving said clutch member into driving engagement with the member of the engine to be started, said last named means including a rod slidably mounted in said first named shaft and a pin extending through said shaft and rod in axial alignment with said second named shaft.

3. In a starter for an internal combustion engine of the type provided with a mounting flange adapted to rigidly support a starter housing in operative relation to a rotatable member of said engine, the combination with said starter housing of a member extending through said housing in coaxial alignment with said engine member, said member extending beyond said housing at both ends thereof, an engine engaging member connected to one end of said first named member, a cranking shaft surrounding said first named member, and means mounted on said cranking shaft for moving said engine engaging member into driving relation to said engine.

4. In a starter for an internal combustion engine of the type provided with a mounting flange adapted to rigidly support a starter housing in operative relation to a rotatable member of said engine, the combination with said starter housing of a member extending through said housing in coaxial alignment with said engine member, said member extending beyond said housing at both ends thereof, an engine engaging member connected to one end of said first named member, an inertia member in said housing, means for energizing said inertia member comprising a shaft surrounding said first named member, and means movable relatively to said shaft for moving said engine engaging member into driving relation to said engine.

5. In an internal combustion engine starter of the type wherein a clutch member is adapted to engage an engine member from which it is normally disengaged, the combination with said clutch member of a flywheel, means including a cranking shaft for accelerating said flywheel to high speed, a rod rotatable with said cranking shaft during the acceleration of the flywheel, and means operable through said rod to move said clutch member into driving engagement with said engine member.

6. In an internal combustion engine starter of a type wherein a clutch member is adapted to engage an engine member from which it is normally disengaged, the combination with said clutch member of a flywheel adapted to rotate said clutch member, means operatively connecting the flywheel and clutch member, means including a crankingshaft for rotating the flywheel, and means for moving the clutch member into engagement with the engine member, said last named means including a rod rotatable with said crankingshaft during the acceleration of the flywheel, a collar slidably mounted on said shaft, means operatively connecting the collar and rod, and means for actuating said collar.

7. In an internal combustion engine starter of a type wherein a clutch member is adapted to engage an engine member from which it is normally disengaged, the combination with said clutch member of a flywheel adapted to rotate said clutch member, means operatively connecting the flywheel and clutch member, means including a crankingshaft for rotating the flywheel, and means for moving the clutch member into engagement with the engine member, said last named means including a rod having sliding engagement with said clutch member and rotatable with said crankingshaft during the acceleration of the flywheel, a collar on said shaft, a pin connecting the collar and rod, and means for moving said collar axially of said shaft.

RAYMOND P. LANSING.